United States Patent [19]

Ushigoe et al.

[11] Patent Number: 4,612,832
[45] Date of Patent: Sep. 23, 1986

[54] MULTIPLE-FUNCTION MACHINE TOOL WITH TWO SPINDLES

[75] Inventors: Tomio Ushigoe, Ueda; Takeo Kobayashi; Yoshitsugu Yoshinaga, both of Nagano; Keiro Tsuchiya; Kazuo Miyagawa, both of Ueda, all of Japan

[73] Assignee: Kabushiki Kaisha Miyano Tekkosho, Nagano, Japan

[21] Appl. No.: 720,897

[22] Filed: Apr. 8, 1985

[30] Foreign Application Priority Data

Apr. 27, 1984 [JP] Japan .................................. 59-87066
Oct. 29, 1984 [JP] Japan .......................... 59-163370[U]

[51] Int. Cl.[4] .............................................. B23B 3/30
[52] U.S. Cl. .......................................... 82/3; 82/2 R;
  82/28 R; 82/36 A; 29/36
[58] Field of Search ................... 82/3, 2.5, 36 A, 2 R,
  82/2 D, 28 R, 2.7; 29/36, 27 C, 27 R

[56] References Cited

U.S. PATENT DOCUMENTS 3,918,331 11/1975 Svanstrom ........................... 82/2 R
4,457,193 7/1984 Matthey .................................. 82/3

FOREIGN PATENT DOCUMENTS 2951565 7/1981 Fed. Rep. of Germany ............ 82/3
3026862 2/1982 Fed. Rep. of Germany ..... 82/36 A
3320940 12/1984 Fed. Rep. of Germany ............ 82/3

Primary Examiner—Francis S. Husar
Assistant Examiner—Jerry Kearns
Attorney, Agent, or Firm—Parkhurst & Oliff

[57] ABSTRACT

A two-spindle machine tool having a fixed first headstock with a main spindle extending in a direction Z and with a chuck, and two tool heads with turrets further has a movable second headstock with a main spindle extending in the direction Z and with a chuck, the second headstock and the two tool heads being supported on respective slide mechanisms which enable them to move in the direction Z and also in a direction X perpendicular thereto relative to the first headstock, and which are so positioned as to enable the two headstocks and two tool heads to function in respective operational regions enabling machining tools held by the turrets to perform various modes of machining including independent but simultaneous machining of respective workpieces held in the two chucks and simultaneous or successive machining of a single workpiece held by either of the chucks.

3 Claims, 12 Drawing Figures

MULTIPLE-FUNCTION MACHINE TOOL WITH TWO SPINDLES

BACKGROUND OF THE INVENTION

This invention relates generally to machine tools having head stocks rotatably supporting main spindles with chucks and tool heads for holding and feeding machining tools relative to workpieces held by the chucks. More particularly, the invention relates to a machine tool having two main spindles in mutually opposed state and two tool heads capable of carrying out machining independently of each other with respective main spindles or carrying out combined machining simultaneously with at least one main spindle.

Among machine tools of this character known heretofore, there has been a machine having two main spindles on which are mounted respective chucks for holding workpieces, and which are disposed in mutually opposed coaxial positions on a common axis of rotation, one of the main spindles being capable of undergoing feeding movement relative to the other in the direction of their axis of rotation. Further, two tool heads, each capable of undergoing relative feeding movements in the direction of the rotational axis of the main spindles and in the direction perpendicular thereto to perform machining in the machining region encompassing the axis of rotation of the main spindles are also provided in this machine.

Such a machine is disclosed in U.S. Pat. No. 4,457,193, dated July 3, 1984, entitled "Machine-Tool Comprising Two Opposed Coaxial Spindles", issued to Maurice Matthey. In the relationship between the main spindles and the tool heads in the arrangement of this machine, the axes of rotation of the two main spindles are on a common line, and, in the case of simultaneous machining by the two tool heads with respective main spindles, there arise problems such as interference of tools and limitation of scope of machining.

For example, in turning work, when internal machining is carried out simultaneously with the two main spindles or in a case such as that wherein, during primary machining with one of the main spindles, the workpiece machined by that main spindle is transferred via conveying means to the other main spindle, or wherein one of the main spindles transfers the workpiece by undergoing a feeding movement relative to the other main spindle, and secondary back surface or reverse machining of the workpiece is carried out, the two tool heads must be maintained in such a mutual positional relation that, with mutual clearance on the axis of rotation of the main spindles, there will be no interference mutually between the tools.

In such a case, there is a great tendency for the two tool heads to undergo relative feeding movement in mutually back-to-back relation in the machining region encompassing the axis of rotation of the main spindles, and the moving distance of the slide in the longitudinal direction becomes great, whereby the machine tends to become large. Furthermore, in order to prevent mutual interference of the tools, the swinging arcs of the tool holders unavoidably become smaller, and the scope of machining with respect to the machine functional capacity becomes narrow. Still another problem is that, also in avoiding tool interference, it is necessary to prepare a program based on the machining processes of the workpieces of the respective main spindles. Such a program gives rise to complications, and at the same time, the editing requires considerable work and time.

SUMMARY OF THE INVENTION

With the object of overcoming the above described problems, this invention provides a machine tool having two main spindles with respective chucks for holding workpieces and two tool heads with respective tool holding means each capable of holding a plurality of different tools, one of the main spindles being fixed and the other spindle and the two tool heads being controllably movable in feeding movements in two orthogonal directions.

According to this invention, briefly summarized, there is provided a two-spindle machine tool having a fixed first headstock with a main spindle extending in a first direction and with a chuck and two tool heads with turrets and characterized by further having a movable second headstock with a main spindle extending in the first direction and with a chuck, the second headstock and the two tool heads being supported on respective slide mechanisms which enable them to move in the first direction and also in a second direction perpendicular thereto relative to the first headstock, and which are so positioned as to enable the two headstocks and two tool heads to function in respective operational regions enabling machining tools held by the turrets to perform various modes of machining including independent but simultaneous machining of respective workpieces held in the two chucks and simultaneous or successive machining of a single workpiece held by either of the chucks.

The nature, utility, and further features of this invention will be more clearly apparent from the following detailed description with respect to a preferred embodiment of the invention when read in conjunction with the accompanying drawings, briefly described below.

Figure 1:
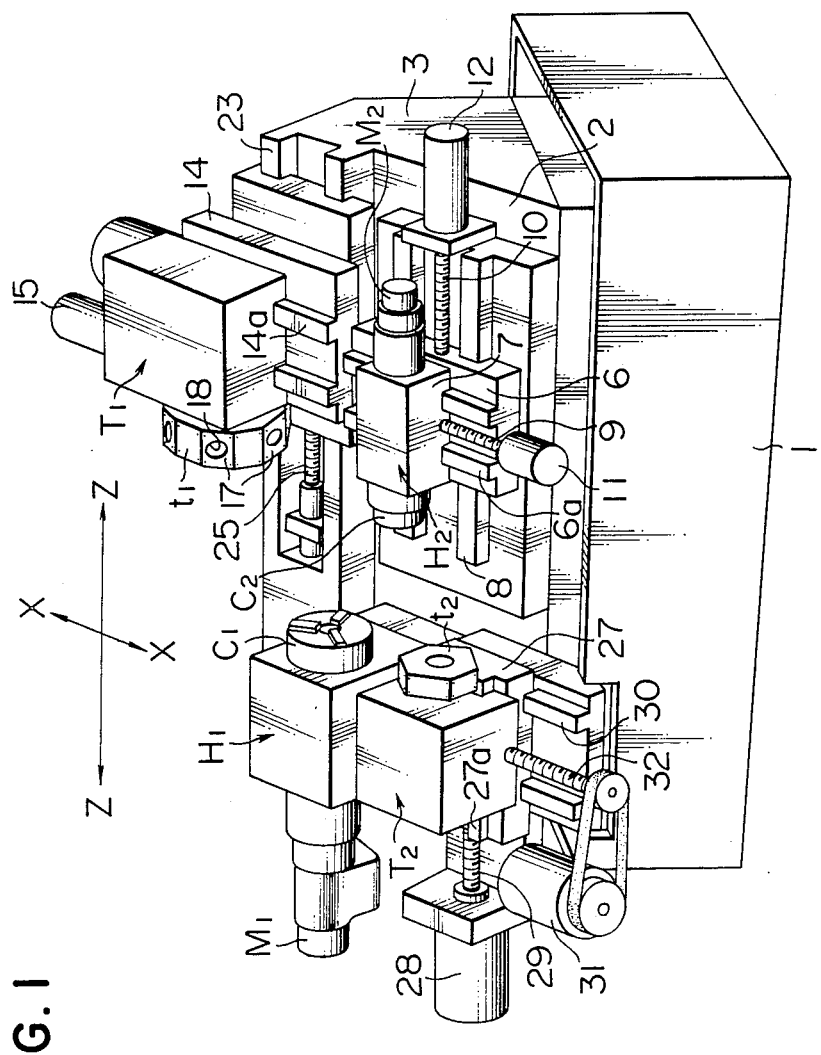
FIG. 1 is a perspective view showing principally the front and upper parts of one example of a machine tool according to the invention.
Figure 2:
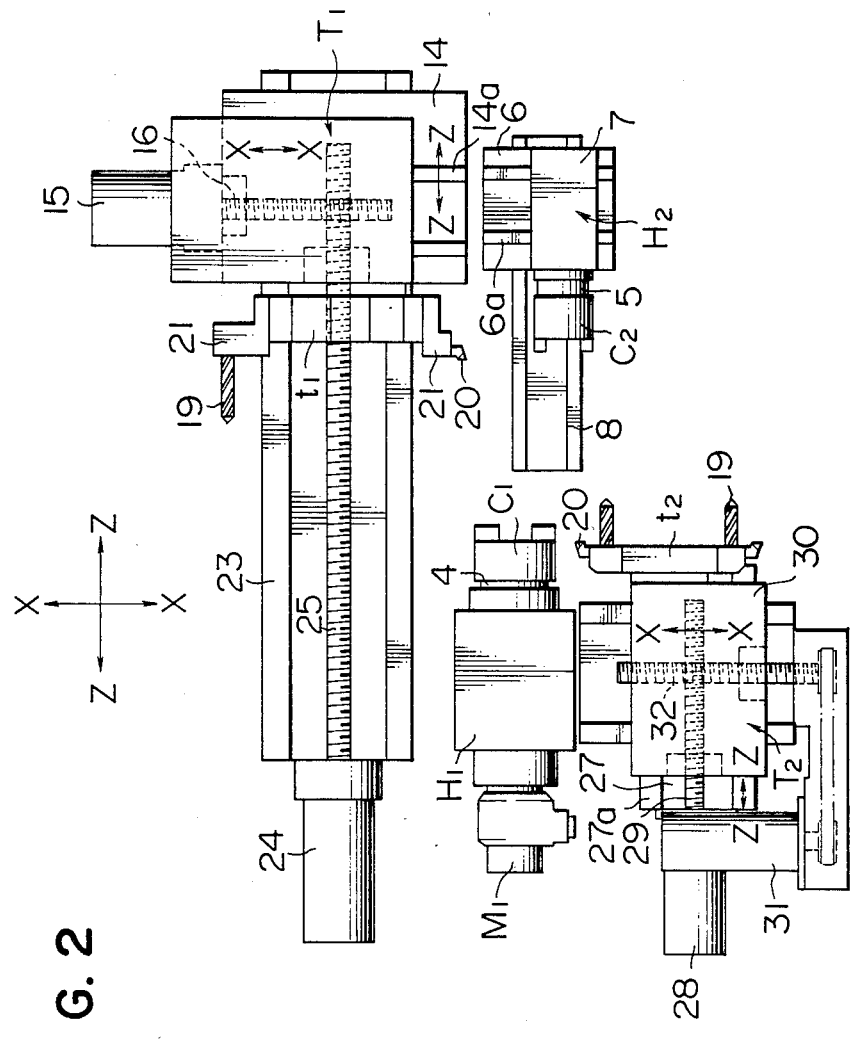
FIG. 2 is a planar view of the upper part of the machine tool showing the essential working parts thereof.

Throughout this disclosure, designation of directions are those as viewed by an operator facing the machine tool. More specifically, as indicated in FIG. 1, a first direction is the Z—Z direction or the left-right direction, and a second direction is the X—X direction or the forward (toward the operator)-rearward (away from the operator) direction.

DETAILED DESCRIPTION OF THE INVENTION

The machine tool of this invention will now be described with respect to one example thereof in the form of a two-spindle, multipurpose lathe. Referring first to FIG. 1, this lathe has a base 1 on which is integrally mounted a support structure 3 having an inclined support surface 2 facing forward and upward. The planar views in FIGS. 2 through 7 are taken in the direction perpendicular to and toward this inclined surface 2.

This inclined surface 2 supports the principal working components of this lathe, which are a first headstock $H_1$ rotatably supporting a first main spindle 4 (FIG. 2) supporting a first chuck $C_1$, a second headstock $H_2$ rotatably supporting a second main spindle 5 (FIG. 2) supporting a second chuck $C_2$, a first tool head $T_1$ supporting a first rotationally indexable turret $t_1$, and a second tool head $T_2$ supporting a second indexable turret $t_2$. The axes of rotation of the first and second main spindles 4 and 5 and of the first and second turrets $t_1$ and $t_2$ are all parallel to the Z direction. The first and second headstocks $H_1$ and $H_2$ are disposed on the left-hand and right-hand sides, respectively, of the inclined surface 2 at positions approximately midway between the forward and rear edges of the inclined surface 2, their chucks $C_1$ and $C_2$ respectively facing rightward and leftward. The first and second tool heads $T_1$ and $T_2$ are positioned substantially rearward of and forward of the second and first headstocks $H_2$ and $H_1$, respectively, and their turrets $t_1$ and $t_2$ are respectively facing leftward and rightward.

The first headstock $H_1$ is fixedly mounted on the inclined surface 2. The second headstock $H_2$ has a spindle head 7 slidably supported on a slideway 6a extending in the X direction along which the spindle head 7 can undergo sliding reciprocating movement in the X direction. The slideway 6a is supported on a slide 6, which in turn is slidably supported on a slideway 8 extending in the Z direction and supported on the inclined surface 2. Thus the second headstock $H_2$ can undergo movements over finite distances in the Z and X directions. The centerline of the slideway 8 is offset somewhat forward from the axis of rotation of the aforementioned first main spindle 4 of the first headstock $H_1$.

The first and second headstocks $H_1$ and $H_2$ are respectively provided with motors $M_1$ and $M_2$ for driving their respective first and second main spindles 4 and 5 together with their first and second chucks $C_1$ and $C_2$. The spindle head 7 is driven in X feed movement by driving means 11 through an X feed screw 9, while the slide 6 is driven in Z feed movement by driving means 12 through a Z feed screw 10.

The relationship between the chucks $C_1$ and $C_2$ of the first and second main spindles 4 and 5 is such that, by operating independently or cooperatively, they have the function of holding a workpiece or workpieces and transmitting rotation thereto through the main spindles and a loading function wherein a workpiece which is supported by the chuck $C_1$ of the first main spindle 4 and has been machined is transferred to the chuck $C_2$ by the relative feed movement of the second headstock, as described hereinafter, it being possible to synchronize the rotational speed of the chuck $C_2$ with any speed of the first main spindle 4.

The first tool head $T_1$ is slidably supported on a slideway 14a extending in the X direction and supported on a slide 14 and is fed in the X direction by a servomotor 15 via an X feed screw 16. The slide 14 is slidably supported on a slideway 23 extending in the Z direction, in which direction it is reciprocatingly driveable by a servomotor 24 through a Z feed screw 25. The slideway 23 is supported on the inclined surface 2. The servomotors 15 and 24 are controlled by numerical control commands to feed machining tools 19 and 20 to machining positions as described hereinafter.

The first tool head $T_1$ rotatably supports the aforementioned indexable turret $t_1$ which is thus rotatable about a horizontal axis parallel to the Z direction. A plurality of tool-mounting faces 17 (FIG. 1) are formed around the outer periphery of this turret $t_1$. Each tool-mounting face 17 is provided with a tool-mounting hole 18 for receiving and firmly holding a tool carrier 21 (FIG. 2) for fixedly supporting a machining tool 19 or 20. In the illustrated embodiment, the machining tool 19 is a drill bit functioning as a tool for forming holes, while the machining tool 20 is a turning tool for machining an outer peripheral surface.

The second tool head $T_2$ is positioned forward of the first headstock $H_1$ as mentioned hereinbefore and can be slidably moved in the Z and X directions along a slideway 27a of a slide 27 by a servomotor 28 through a Z feed screw 29 and along a slideway 30 by a servomotor 31 through an X feed screw 32.

As described hereinbefore, the first and second tool heads $T_1$ and $T_2$ are respectively positioned to the rear of the second headstock $H_2$ and forward of the first headstock $H_1$, being disposed on opposite sides of a Z-direction line joining the first and second headstocks $H_1$ and $H_2$. While these tool heads and headstocks have been described as being mounted on an inclined surface 2, their supporting surface is not necessarily limited to an inclined surface but can be a horizontal surface or a vertical surface. The two tool heads $T_1$ and $T_2$ can be adapted to move independently in the Z and X directions.

Next the invention will be described with respect to its functional effectiveness and utility. Since the machine according to this invention has a fixed main spindle and a movable main spindle and two movable tool heads, they can be utilized in various combinations to perform numerous different modes of machining operations. For example, with respect to one headstock, the two tool heads can be operated simultaneously to perform machining or they may be used to machine independently for respective headstocks.

Figure 3:
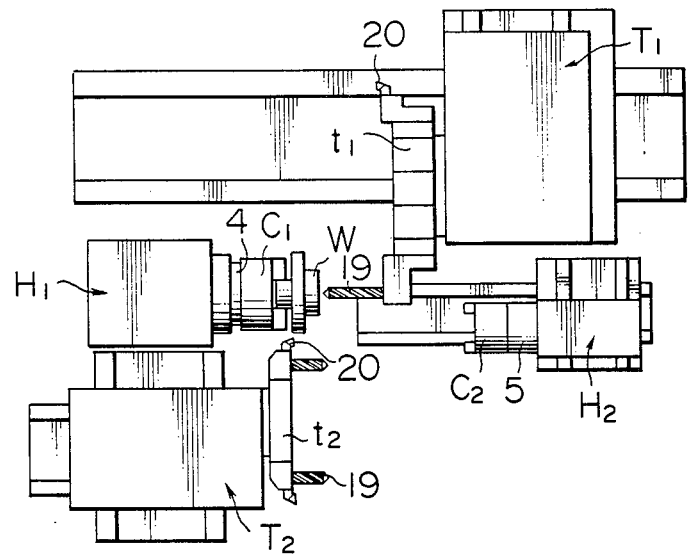
FIGS. 3 through 7 are simplified planar views similar to FIG. 2 showing examples of different modes of machining work which can be accomplished by the machine tool of the invention.

In the former case, as illustrated in FIG. 3, the first and second tool heads $T_1$ and $T_2$ operate relatively with respect to the first main spindle 4, the chuck $C_1$ of which is holding a workpiece W, and internal and external machining is carried out on the workpiece W with inner and outer surface cutting tools 19 and 20 respectively held by the turrets $t_1$ and $t_2$ of the first and second tool heads $T_1$ and $T_2$. In this case the second main spindle 5 is idle.

Figure 4:
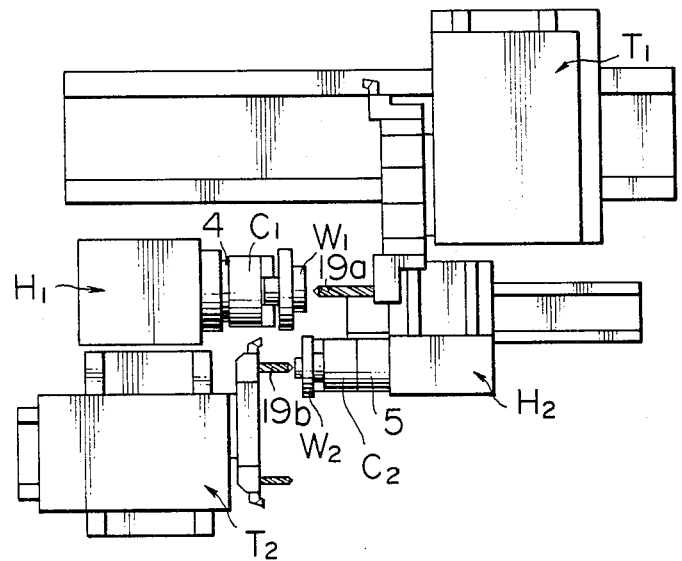

In the latter case, as illustrated in FIG. 4, workpieces $W_1$ and $W_2$ are respectively held by the chucks $C_1$ and $C_2$ of the first and second main spindles 4 and 5 and machined independently and respectively with tools 19a and 19b held by the turrets $t_1$ and $t_2$ of the tool heads $T_1$ and $T_2$ which are fed independently and relatively to the workpieces $W_1$ and $W_2$.

Figure 12:
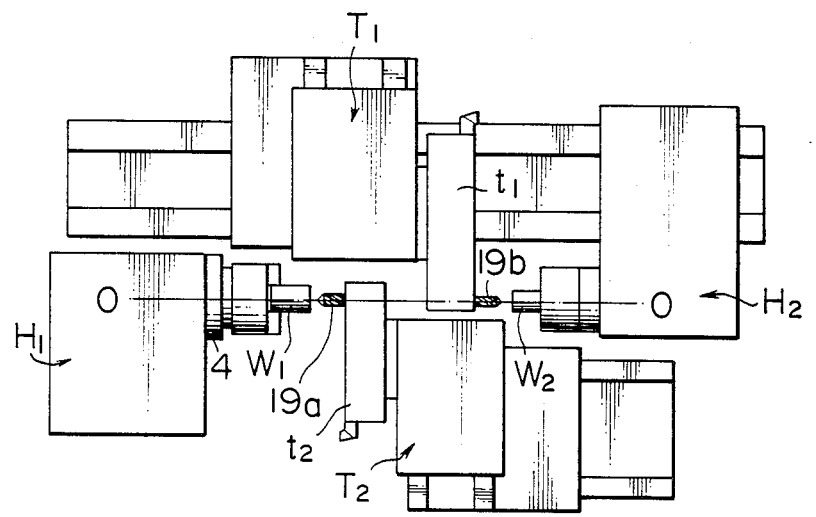
FIG. 12 is a simplified planar view similar to FIG. 4 showing a known two-spindle machine tool.

Particularly in the case where machining is carried out by holding internal machining tools 19a and 19b for carrying out internal machining of considerable length by means of the first and second tool deads $T_1$ and $T_2$, since the rotational axes of the two main spindles described in the specification of the U.S. patent mentioned hereinbefore lie on the same common line O—O as shown in FIG. 12, one of the turrets $t_1$ and $t_2$ of the tool heads $T_1$ and $T_2$ intrudes into the machining region from the back side or front side of the turret of one of the tool heads, and machining is carried out with the turrets in back-to-back state. For this reason, the distances of movement of the tool heads $T_1$ and $T_2$ in the longitudinal or Z direction are restricted to a great degree. Furthermore, with respect to the diametrical direction of the workpiece $W_1$ and $W_2$, also, the scope of machining is reduced as a result of being restricted for reasons of mutual tooling difficulty of the two tool heads.

These problems can of course be solved by increasing the slide movement distances of the tool heads, but this would increase the machine size and therefore its required space.

In accordance with this invention, a layout arrangement of the tool heads and one main spindle which can undergo relative feeding movement in the transverse or X direction from the rotational axis of the other main spindle, as shown in FIG. 4, can be used. Accordingly, even when two internal machining tools $19a$ and $19b$ are used, there is no restriction of machining scope and no mutual interference of the tools on the two tool heads $T_1$ and $T_2$, whereby the instant mode of machining can be accomplished with a machine occupying a relatively small space.

Figure 5:
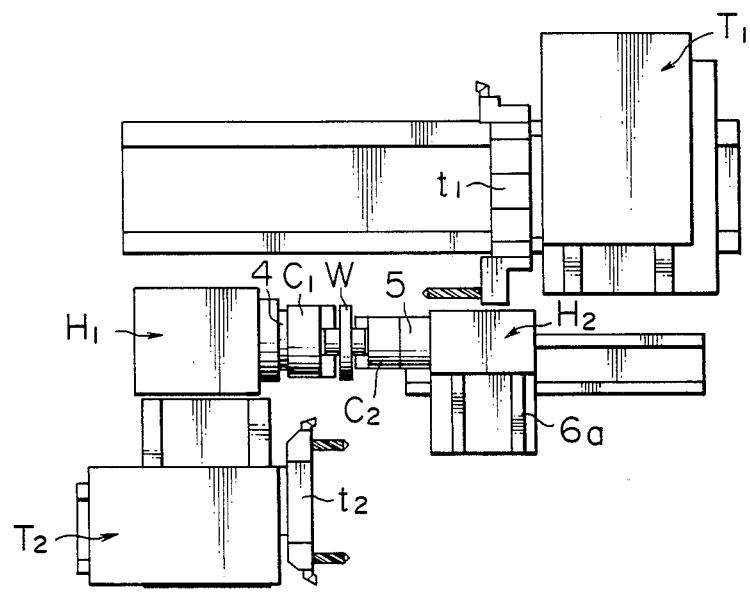
Figure 6:
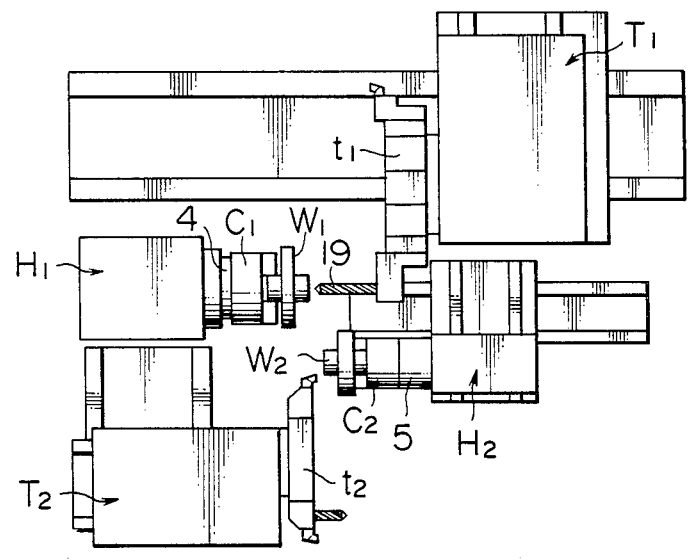
Figure 7:
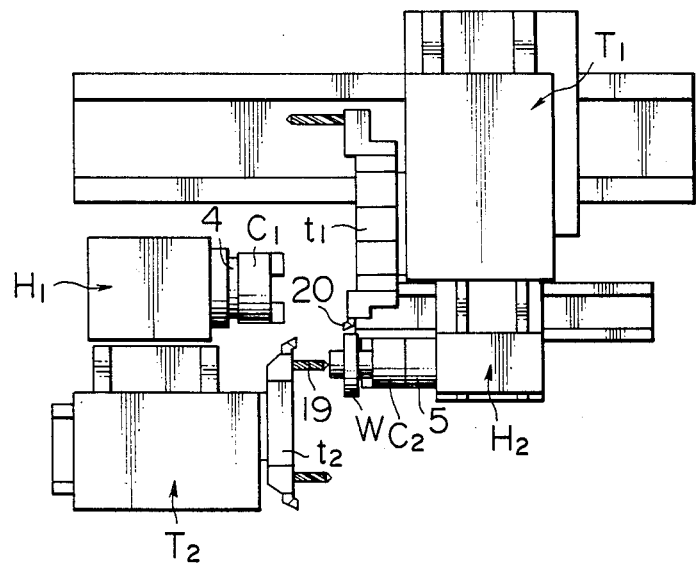

Other examples of modes of machining operation to which the machine tool of this invention can be advantageously applied are illustrated in FIGS. 5, 6, and 7.

FIG. 5 shows a mode wherein the second headstock $H_2$ with the second main spindle 5 and chuck $C_2$ advances leftward and receives a workpiece W transferred from the chuck $C_1$ of the first main spindle 4 (loading function). In this case, the second headstock $H_2$ has been fed rearward along the X slideway $6a$ to a position where the axis of rotation of the second main spindle 5 is coincidentally aligned with that of the first main spindle 4.

A mode of machining wherein two workpieces $W_1$ and $W_2$ are held by the chucks $C_1$ and $C_2$, respectively, of the two main spindles 4 and 5 and are respectively machined by tools mounted on the turrets $t_1$ and $t_2$ of the tool heads $T_1$ and $T_2$ is illustrated in FIG. 6. The machining of the workpiece $W_2$ on the chuck $C_2$ could be a second machining step following a first machining step carried out on the chuck $C_1$, this workpiece $W_2$ having been transferred from the chuck $C_1$ to the chuck $C_2$ by the procedure indicated in FIG. 5.

FIG. 7 illustrates a mode wherein a workpiece W held by the chuck $C_2$ of the second main spindle 5 is simultaneously machined externally and internally by tools 20 and 19 mounted respectively on the turrets $t_1$ and $t_2$ of the two tool heads $T_1$ and $T_2$. In this case the first main spindle 4 and the first chuck $C_1$ are idle.

Figure 8:
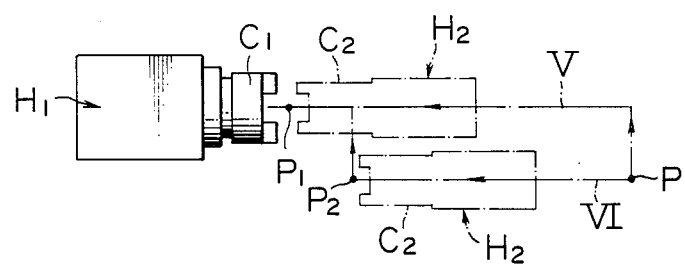
FIG. 8 is a schematic planar view indicating different positions assumed and operational paths taken by the second headstock.

An important feature of this invention is the mobility of the second headstock $H_2$ in the X direction, in addition to its mobility in the Z direction. The combined mobility is qualitatively indicated in FIG. 8 in which V indicates a locus through which a point P on the chuck $C_2$ at the reference position moves to a point $P_1$ in the mode shown in FIG. 5 and VI a locus through which the point P moves to a point $P_2$ in the mode shown in FIG. 6. It is this mobility of the second headstock $H_2$ which enables the machine to perform various modes of operation as herein described with respect to only a few basic examples and distinguishes this machine tool from those of a similar nature of the prior art.

Figure 9:
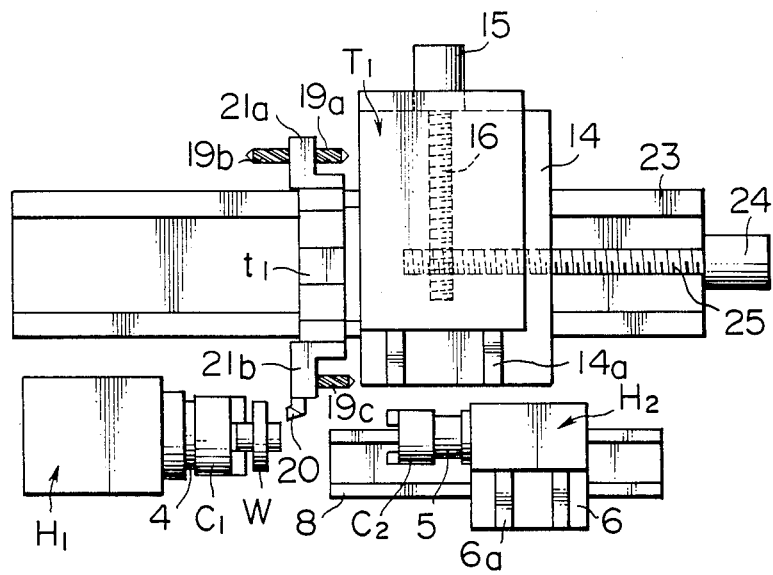
FIGS. 9 and 10 are planar views showing special machining operations made possible by mounting cutting tools on opposite sides of the turret of the first tool head.
Figure 10:
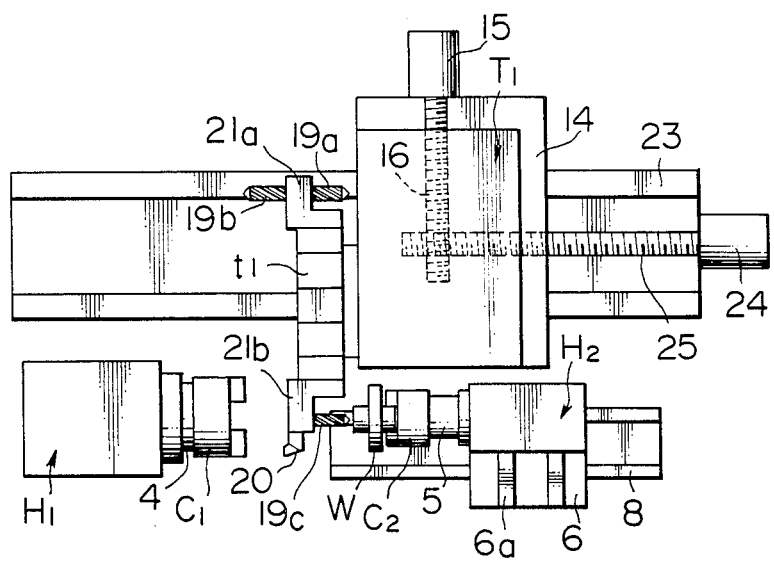
Figure 11:
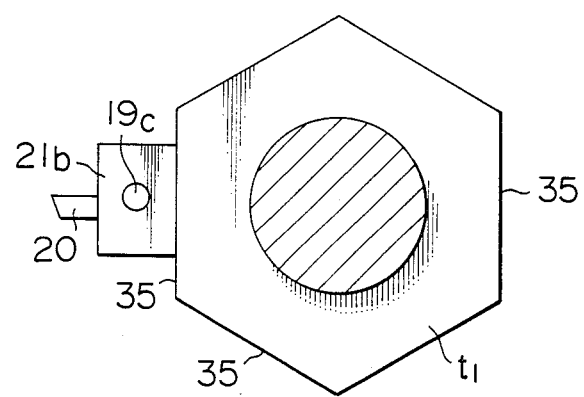
FIG. 11 is a view taken in the axial direction of the same turret showing the mounting of the tools.

A modification of the mode of mounting tools on a turret of a tool head is shown in FIGS. 9, 10, and 11 and illustrates the possibilities of further expansion of the versatility of the instant machine tool. In this example, the turret $t_1$ of the first tool head $T_1$ has a hexagonal shape in cross section taken in a plane perpendicular to its rotational axis and therefore has six tool-mounting faces 35 around its periphery. Each face 35 has a hole (not shown) for receiving a tool carrier 21. One example of a tool carrier, $21a$, holds two internal machining tools $19a$ and $19b$ projecting in opposite directions parallel to the Z direction. Another example $21b$ of a tool carrier holds an internal machining tool $19c$ projecting toward the right and also an external machining tool 20 projecting radially outward from the turret $t_1$. The above described machining tools are used in the following manner.

In an ordinary manner, as indicated in FIG. 9, a workpiece W held by the chuck $C_1$ of the first main spindle 4 is machined with the tool 20 facing the work W and held by the tool carrier $21b$ mounted on the first turret $t_1$, which is undergoing its set motion in its machining region as a result of the relative and combined movements of the first tool head $T_1$ and its slide 14. Then, in the case where the back face of the workpiece W held by the chuck $C_1$ is to be machined, that is, in the case where all machining steps with respect to the workpiece W are to be completed in one process cycle of the machine, the tool 20 which has been facing the first main spindle 4 is retracted to a region in which it will be clear of the machining region of the first main spindle 4.

Then the second headstock $H_2$ is caused to approach coaxially the first headstock $H_1$ after the first machining step, and the workpiece W is transferred from the chuck $C_1$ to the chuck $C_2$ of the second headstock $H_2$ as described hereinbefore. Then the first tool head $T_1$ and its slide 14 are caused to undergo relative feeding movements toward the second main spindle 5 as shown in FIG. 10, and back-face machining of the workpiece W held by the chuck $C_2$ is carried out with the tool $19c$ also as shown in FIG. 10. For this operation, the tool $19c$ used for the machining on the second main spindle 5 is held by the same tool carrier $21b$ of the turret $t_1$ as the tool 20 used in the machining on the first main spindle 4, as described hereinbefore.

In general, in a machine tool provided with an indexable turret, the machining capacity or versatility of the machine is determined by the number of tools that can be carried on the turret. With increase in the number of carried tools, the indexing cycle time increases. At the same time the indexing inertia increases, and the accuracy and positiveness of positioning precision is impaired.

Furthermore, in the case where the turret diameter is reduced, and tools are mounted in mutually adjacent doubled state in the turret radial direction or circumferential direction on each tool mounting face of the turret, the regions of interference between the workpiece and the tools become large, and the scope of machineable articles becomes restricted to small-size articles, whereby the machining capability of the machine tool cannot be fully utilized in some cases.

In a machine tool having two mutually opposed main spindles, in the case where back-face machining is carried out in a secondary machining step subsequent to a primary machining step, selection of a tool different from that of primary step is required in the secondary step, whereby the number of tools increases as a natural result. In the machine tool according to this invention as described above, the mounting on the turrets of tools for the secondary machining step of the same number as those required in the primary machining step becomes possible without lowering the machining capacity of the primary machining step, and the above described problem is overcome.

What is claimed is:

1. A two-spindle machine tool, comprising:
    a support structure integrally supported on a base;
    a first headstock fixedly supported on the support structure and having a first main spindle extending in a first direction and provided with a first chuck;
    motor means operatively connected to said first main spindle for rotating the first main spindle;
    a second headstock having a spindle head supporting a second main spindle extending in said first direction and provided with a second chuck in opposed facing relation with the first chuck;
    motor means operatively connected to said second main spindle for rotating the second main spindle;
    second headstock slide means mounted on the support structure and supporting thereon the spindle head of the second headstock, said slide means having a first slideway extending in said first direction and a second slideway extending in a second direction perpendicular to said first direction, said first and second slideway making the spindle head translationally movable in said first and second directions, respectively, while the second main spindle is constantly maintained parallel to the first main spindle, the positions thus assumable by the spindle head including a specific position wherein the first and second main spindles are aligned on a common axis;
    driving means operatively connected to said spindle head for moving the spindle head in said first and second directions along said first and second slideways;
    a first tool head for holding machining tools;
    first tool-head slide means mounted on the support structure and supporting thereon the first tool head, said first tool-head slide means being disposed adjacent the movable range of the second headstock at one side of said common axis and having a first slideway extending in said first direction and a second slideway extending in second direction, said first and second slideways making the first tool head translationally movable in said first and second directions, respectively;
    servomotor means operatively connected to said first tool head for moving the first tool head in said first and second directions along said first and second slideways of the first tool-head slide means;
    an indexable first turret mounted on the first tool head for holding various machining tools with a plurality of orientations, said first turret being positioned on the side of the first tool head facing the first headstock with respect to said first direction such that a machining tool held on the turret acts on a workpiece held by the first chuck or the second chuck;
    a second tool head for holding machining tools;
    second tool-head slide means mounted on the support structure and supporting thereon the second tool head, said second tool-head slide means being disposed adjacent the first headstock at the other side of said common axis, said second tool-head slide means having a first slideway extending in said first direction and a second slideway extending in said second direction, said first and second slideways making the second tool head translationally movable in said first and second directions, respectively;
    servomotor means operatively connected to said second tool head for moving the second tool head in said first and second directions along said first and second slideways of the second tool-head slide means; and
    an indexable second turret mounted on the second tool head for holding various machining tools with a plurality of orientations, said second turret being positioned on the side of the second tool head facing the second headstock with respect to said first direction such that a machining tool held on the turret can be caused to act on a workpiece held by the first chuck or the second chuck.

2. A two-spindle machine tool according to claim 1, wherein said positions assumable by the spindle head except said specific position are those wherein the second main spindle is at the other side of said common axis.

3. A two-spindle machine tool according to claim 1, wherein each of said turrets comprises a plurality of tool mounting surfaces on each of which a pair of machining tools are mounted, said machining tools having cutting edges which are directed oppositely with respect to said first direction.

* * * * *